United States Patent [19]
Inoue et al.

[11] Patent Number: 5,229,555
[45] Date of Patent: Jul. 20, 1993

[54] SPEAKER SYSTEM AND TV WITH THE SAME

[75] Inventors: Hideaki Inoue; Kiyoshi Ohashi, both of Tsu; Asahiko Okada, Matsusaka; Hiroshi Koshiishi, Hirakata; Toshiharu Takahashi, Osaka, all of Japan

[73] Assignee: Matsushita Electric Industrial Co., Ltd., Osaka, Japan

[21] Appl. No.: 672,939

[22] Filed: Mar. 21, 1991

[30] Foreign Application Priority Data

Mar. 30, 1990 [JP] Japan .................. 2-086552
Oct. 29, 1990 [JP] Japan .................. 2-292369

[51] Int. Cl.$^5$ ............................................. H05K 5/00
[52] U.S. Cl. .................................. 181/146; 181/151; 181/152; 181/155; 181/199
[58] Field of Search ............... 181/144, 145, 146, 147, 181/151, 152, 153, 155, 156, 159, 191, 198, 199; 381/156, 158

[56] References Cited

U.S. PATENT DOCUMENTS

| | | | |
|---|---|---|---|
| 3,155,774 | 11/1964 | Howell | 181/146 |
| 4,733,749 | 3/1988 | Newman et al. | 181/144 |
| 4,893,695 | 11/1990 | Tamura et al. | 181/151 |

FOREIGN PATENT DOCUMENTS

| | | |
|---|---|---|
| 0342117 | 11/1989 | European Pat. Off. |
| 2245143 | 4/1975 | France |
| 2212694 | 7/1989 | United Kingdom |

*Primary Examiner*—Michael L. Gellner
*Assistant Examiner*—Khanh Dang
*Attorney, Agent, or Firm*—Stevens, Davis, Miller & Mosher

[57] ABSTRACT

In the speaker system, an acoustic pipe for conducting a sound wave is arranged in front of a speaker for reproducing a middle and low frequency sound. The acoustic pipe has a rectangular open end portion. A speaker for reproducing a high frequency sound is disposed within the acoustic pipe coaxially with and in front of the speaker for reproducing the middle and low frequency. With this construction, attenuation of middle and high frequency components of sound signals which are produced from the middle and low frequency sound reproducing speaker is suppressed. Moreover, it is possible to conduct the high and middle frequency components and a high frequency component, which is reproduced by the high frequency sound reproducing speaker, as naturally composed sound signals to the open end portion of the acoustic pipe. The speaker system thus exhibits excellent characteristics in sound image localization and articulation of sound, thereby providing a high tone quality to the TV. The TV may be miniaturized with the speaker system.

6 Claims, 9 Drawing Sheets

FIG.17
PROR ART

SPEAKER SYSTEM AND TV WITH THE SAME

BACKGROUND OF THE INVENTION

The present invention relates to a speaker system which is used for video equipment, such as a TV and audio equipment for automobile and a TV utilizing the speaker system.

A method for providing a horn or an acoustic pipe in the front of a speaker to introduce sound wave generated by the speaker to an opening of the horn or the acoustic pipe has been widely used since it has advantages by which large sound pressure can be obtained and sound can be transferred in a specific direction in comparision with a case in which no horn or acoustic pipe is used. A prior art speaker system with an acoustic pipe will be described with reference to FIGS. 13 to 17.

Figure 13:
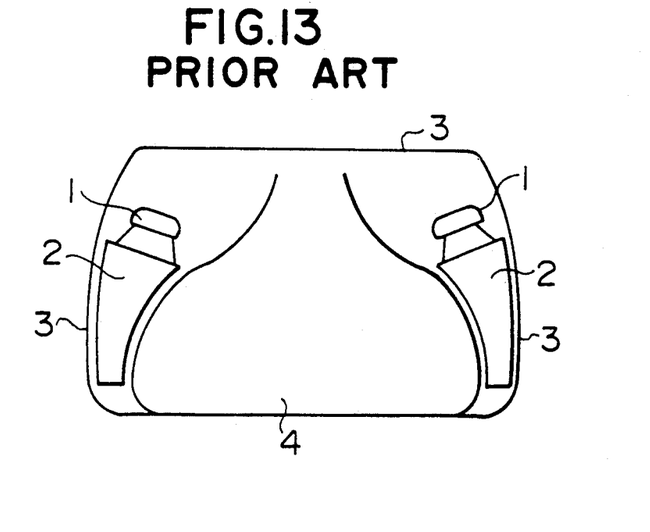
FIG. 13 is a diagrammatic horizontal sectional view of a TV having prior art speaker systems.

FIG. 13 is a plan view illustrating a TV with a pair of middle and low frequency range speaker systems which comprise the prior art speaker systems in which acoustic pipes are used. The speaker systems are incorporated into the TV to be located along a cathode tube 4. Each of the speaker systems includes a middle and low frequency range reproducing speaker 1 and an acoustic pipe 2 disposed in front thereof for conducting sound wave. A TV cabinet 3 of the TV is formed to fit to the speaker systems for miniaturizing the TV in size.

Figure 14:
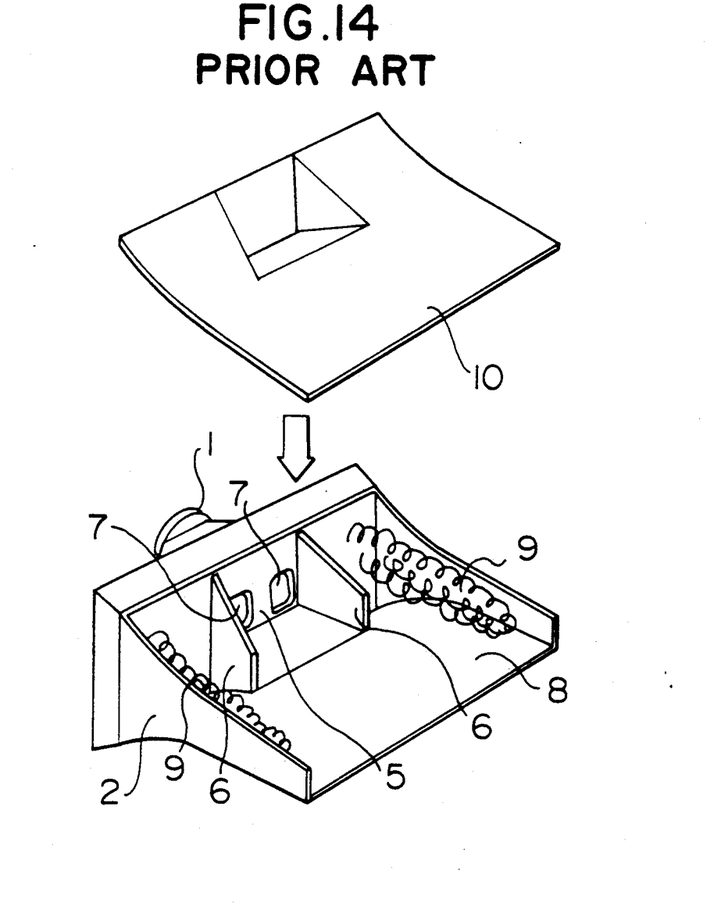
FIG. 14 is an enlarged, exploded perspective view of the prior art speaker system of FIG. 13.

FIG. 14 is an exploded perspective view showing the construction of the prior art speaker system of FIG. 13. In FIG. 14, reference numeral 5 designates an acoustic equalizer provided at an front portion of the middle and low frequency range reproducing speaker 1. On the opposite sides of the acoustic equalizer 5 there are formed a pair of apertures 7 for conducting sound wave emitted from the middle and low frequency range reproducing speaker 1 into the acoustic pipe 2. Reflection plates 6 are provided outside the apertures 7. A sound absorbing material 9 is placed on both sides of the reflection plates 6. Each of the acoustic pipes 2 includes a panel 8 and a cover 10 covering an upper open side thereof.

The acoustic equalizer 5 and the reflection plates 6 which are provided in the front of each of the speakers 1 serve to improve high frequency characteristic of the speaker system. The sound absorbing material 9 placed outside the vertical reflection plate 6 serves to suppress a standing wave which is produced within the acoustic pipe 2. Each of the acoustic pipe 2 is formed so that the cross-sectional area thereof is gradually increased from the front portion of the middle and low frequency range reproducing speaker 1 toward the open end of the acoustic pipe.

Figure 15:
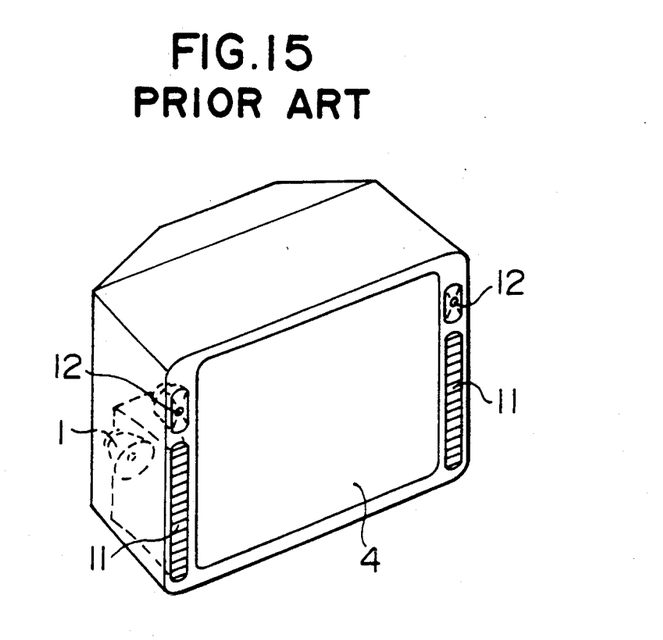
FIGS. 15 and 16 are perspective views of TVs each using two pairs of a high frequency range reproducing speaker and a middle and low frequency range reproducing speaker of the prior art.
Figure 16:
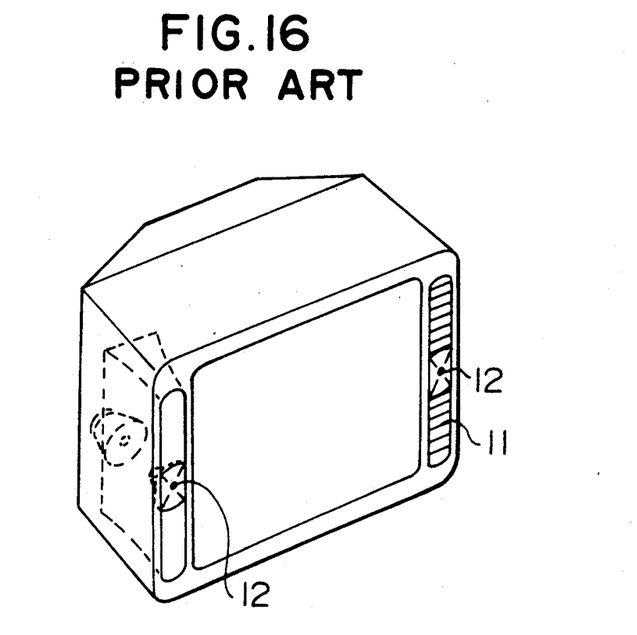
Figure 17:
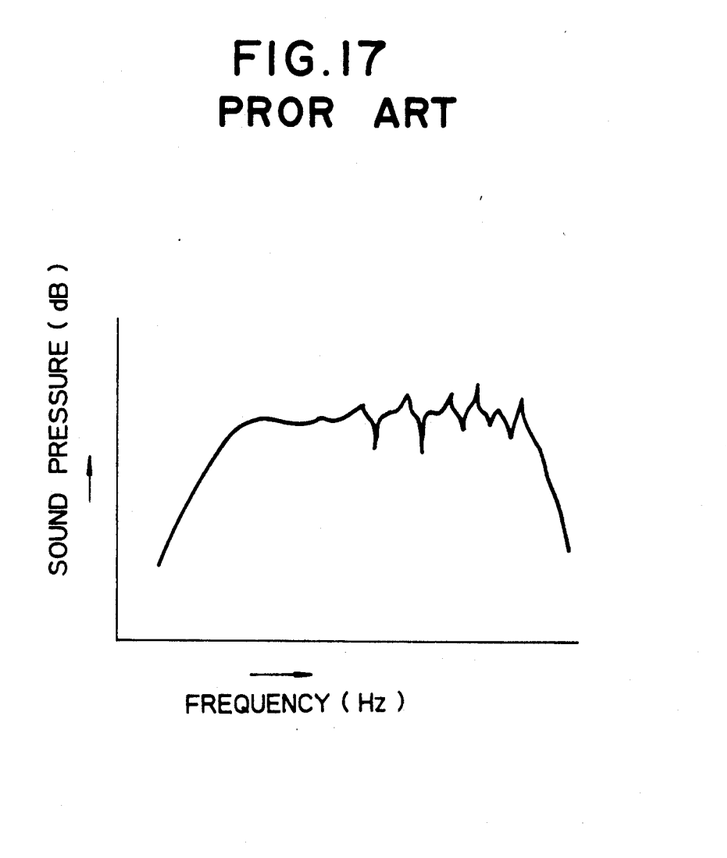
FIG. 17 is a sound pressure vs. frequency characteristic graph of the prior art speaker systems incorporated into a TV.

FIGS. 15 and 16 are perspective views showing conventional TVs each utilizing middle and low frequency range reproducing speaker systems with acoustic pipes 2 above described and high frequency range reproducing speakers. In FIG. 15, reference numeral 11 designates an open end of the acoustic pipe of each of the middle and low frequency range reproducing speaker systems, and 12 indicates a high frequency range reproducing speaker arranged above the open end 11. In the TV of FIG. 16, each of the high frequency range reproducing speakers 12 is arranged at the front portion of the open end 11 of the corresponding middle and low frequency range reproducing speaker system.

To make the TV compact relatively easily, the high frequency range reproducing speakers 12 are placed at the front of the TV for the following reasons: for the purpose of conducting sound to the opening end portion thereof in a manner similar to that of the middle and low frequency range reproducing speaker system using the acoustic pipe 2, it is necessary to appropriately dispose a sound absorbing material 9 within the acoustic pipe 2 to remove a standing wave generated within the acoustic pipe 2; and the inner construction of the acoustic pipe 2 becomes rather complicated to conduct a high frequency component to the front of the open end 11 without attenuation.

These construction, however, makes the middle and low frequency range reproducing speaker 1 and the high frequency range reproducing speaker 12 rather different from each other in mounted position, and the difference in phase between sound waves reproduced by the middle and low frequency range reproducing speaker 1 and the high frequency range reproducing speaker 12 is produced in every frequency band. Thus, as shown at 24 in FIG. 17, a sound pressure vs. frequency characteristic with many peak dips is thus provided to the speaker systems, and the speaker systems are also provided with an unnatural tone quality.

Furthermore, the TV having the high frequency range reproducing speaker 12 arranged above the middle and low frequency range reproducing speaker 1 as shown in FIG. 15 raises a problem in that sound moves up and down in a middle and high frequency range since the middle and low frequency range reproducing speaker 1 and the high frequency range reproducing speaker 12 are greatly different in mounted position. This deteriorates performance of the speaker systems in sound image localization and articulation of sound, and the speaker systems are not sufficient for an advanced TV.

Accordingly, it is an object of the present invention to provide a speaker system which is capable of exhibiting excellent sound characteristics in sound image localization and in articulation of sound, which cannot be provided by the prior art.

SUMMARY OF THE INVENTION

In view of this object, the present invention provides a speaker system characterized in that an acoustic pipe for conducting a sound wave is arranged in front of a speaker for reproducing a middle and low frequency sound, the acoustic pipe having a substantially rectangular open end portion, a speaker for reproducing a high frequency sound is disposed within the acoustic pipe coaxially with and in front of the speaker for reproducing the middle and low frequency sound, a sound absorbing material is disposed on opposite sides of the speaker for reproducing the high frequency sound so as to interpose a cavity therebetween, the cavities conducting the sound wave from the speaker for reproducing the middle and low frequency sound, an area of an opening portion in front of the speaker for reproducing the middle and low frequency sound is made smaller as an acoustic equalizer by 20 to 50% than an effective radiation area of the speaker for reproducing the middle and low frequency sound by using a magnetic circuit portion of the speaker for reproducing the high frequency sound, and the opening end portion of the acoustic pipe is larger in area of the sound conductor than the front portion of the speaker for reproducing the middle and low frequency sound.

Reflection plates may be disposed on opposite sides of the front portion of the speaker for reproducing the high frequency sound, the reflection plates constituting a sound conductor for conducting a sound wave emitted from the speaker for reproducing the high frequency sound.

With these features, attenuation of middle and high frequency components of sound signals which are produced from the middle and low frequency range reproducing speaker is thus suppressed. Moreover, it is possible to conduct the high and middle frequency components and a high frequency component, which is reproduced by the high frequency range reproducing speaker, as naturally composed sound signals to the open end portion of the acoustic pipe. The speaker system thus exhibits excellent characteristics in sound image localization and articulation of sound, thereby providing a high tone quality to the TV. The TV may be miniaturized with the speaker system.

DETAILED DESCRIPTION OF THE PREFERRED EMBODIMENTS

Referring to FIGS. 1 to 13, several embodiments of the present invention will be described. In FIGS. 1 to 13, the same reference numerals as those of FIGS. 11 to 14 designate corresponding parts, of which description will be omitted or simplified hereinafter.

Figure 1:
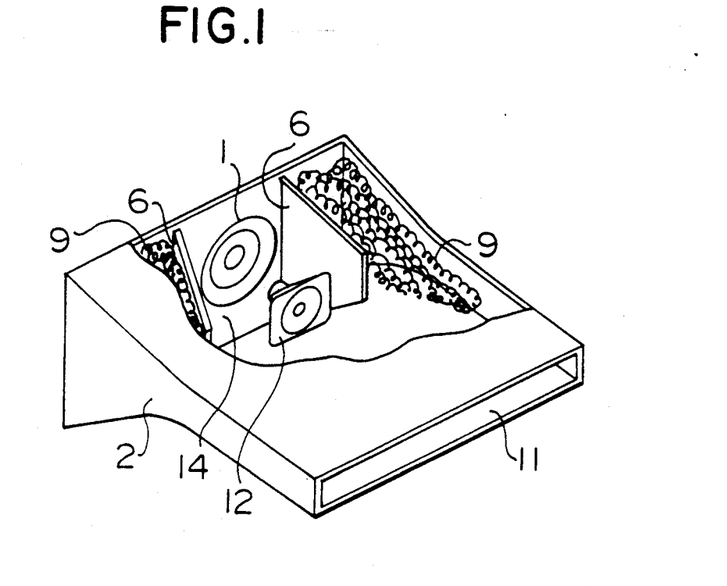
FIG. 1 is a perspective view, partly cut away, illustrating a first embodiment of a speaker system of the present invention.
Figure 2:
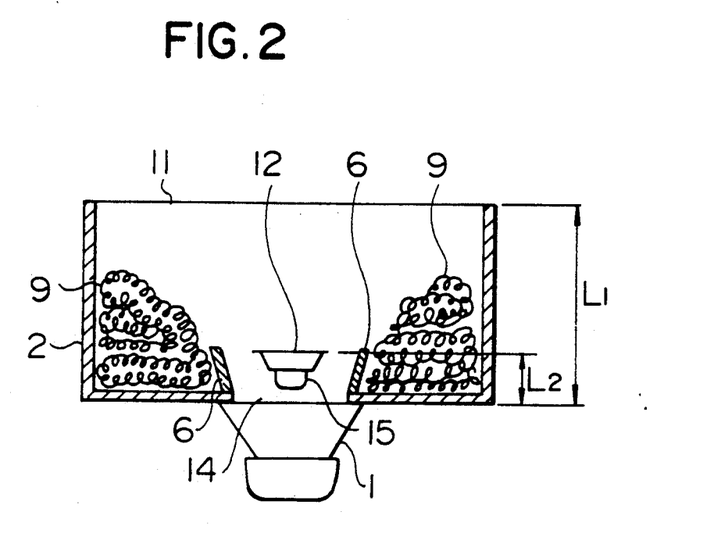
FIG. 2 is a cross-sectional view on a modified scale of the speaker system of FIG. 1.

FIGS. 1 and 2 illustrate a first embodiment of a speaker system of the present invention, in which an acoustic pipe 2 is arranged in the front of a middle and low frequency range reproducing speaker 1. The acoustic pipe 2 has an elongated rectangular front open end 11 which is formed in view of incorporation into a specific appliance. Within the acoustic pipe 2 there is provided a high frequency range reproducing speaker 12 in front of and in the vicinity of the middle and low frequency range reproducing speaker 1 for axial alignment. A cavity 14 serves to conduct sound wave of the middle and low frequency range reproducing speaker 1. Reflection plates 6 and sound absorbing material 9 are arranged on both sides of the high frequency range reproducing speaker 12 and the cavity 14.

In FIG. 2, reference numeral 15 indicates a magnetic circuit portion of the high frequency range reproducing speaker 12. Magnetic circuit portion 15 serves as an acoustic equalizer of the middle and low frequency range reproducing speaker 1. For this reason, the magnetic circuit portion 15 is coaxially closely arranged with the front portion of the middle and low frequency range reproducing speaker 1. The cross-sectional or vertical sectional area of the cavity 14 is smaller by about 20 to 50% than an effective radiation area of the middle and low frequency range reproducing speaker 1. An open end of the acoustic pipe 2 is formed sufficiently large in cross-sectional area as compared to the cavity 14 at the front of the middle and low frequency range reproducing speaker 1.

Figure 3:
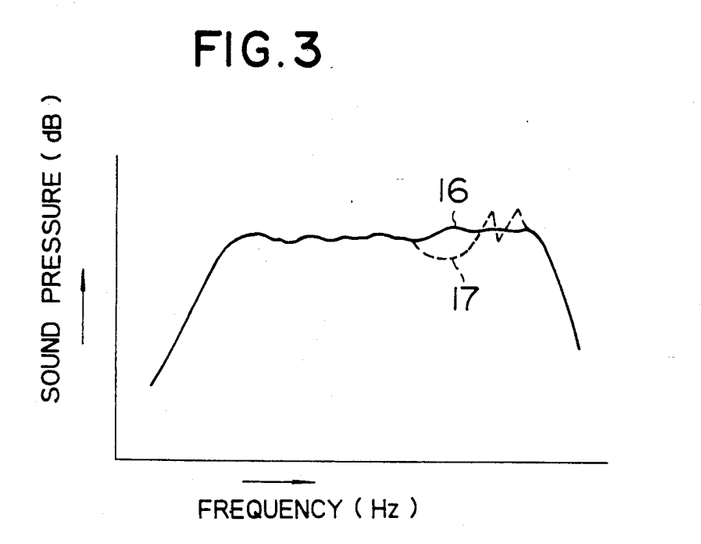
FIG. 3 is a graph showing a sound pressure vs. frequency characteristic of the speaker system of FIGS. 1 and 2, the speaker system being incorporated into a TV.

In the speaker system according to the present invention, since the high frequency range reproducing speaker 12 is coaxially and closely arranged in front of the middle and low frequency range reproducing speaker 1, attenuation of middle and low frequency components of sound signals which are produced from the middle and low frequency range reproducing speaker 1 is thus suppressed. Moreover, it is possible to conduct the middle and low frequency components and a high frequency component, which is reproduced by the high frequency range reproducing speaker 12, as naturally composed sound signals to the open end 11 of the acoustic pipe 2. Thus, the speaker system is capable of exhibiting a characteristic with small peak dips as shown in the sound pressure-frequency characteristic curve of the speaker system for a TV in FIG. 3 by reference numeral 16. Furthermore, the problem of which sound moves up and down in a high and middle frequency range is overcome by close coaxial arrangement of the two speakers. This embodiment exhibits an excellent characteristic in sound image localization and in articulation of sound.

In this embodiment, a distance L2 from a surface on which the middle and low frequency range reproducing speaker 1 is mounted to a surface on which the high frequency range reproducing speaker 12 is mounted is substantially set to be not larger than $L2 = (\frac{1}{4})L1$ where L1 is a distance from the mounted surface of the middle and low frequency range reproducing speaker 1 to the open end 11 of the acoustic pipe 2.

The sound pressure-frequency characteristic of the speaker system of this embodiment largely depends upon the mounted position of the high frequency range reproducing speaker 12. As the mounted position of the high frequency range reproducing speaker 12 approaches toward the open end 11 of the acoustic pipe 2, the speaker system exhibits a sound pressure-frequency characteristic such that sound pressure drops in the middle and high frequency range, and many peak dips take place as shown by the reference numeral 17 in FIG. 3. This is because the magnetic circuit portion 15 of the high frequency range reproducing speaker 12 does not function as the acoustic equalizer for the middle and low frequency range reproducing speaker 1, and because an increase in difference between the mounted position of the two speakers causes the difference in phase between sound waves reproduced from the two speakers in the high and middle frequency range.

Figure 4:
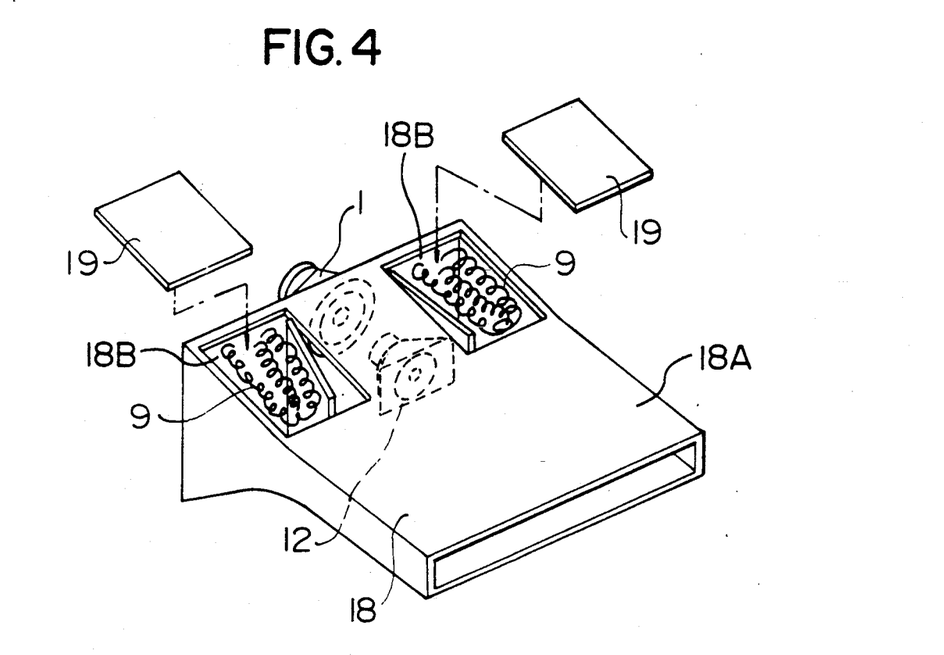
FIG. 4 is a modified form of the first embodiment in which an acoustic pipe is integrally formed.

FIG. 4 illustrates a modified form of the speaker system of FIG. 1. In the modified speaker system, the acoustic pipe 18 has an integrally moldable structure which is made by integrally forming the cover 10 with the pipe 2 of the first embodiment. The acoustic pipe 18 is provided at one panel portion 18A with a pair of openings 18B at portions corresponding to locations to accommodate the sound absorbing material 9. Each of the openings 18B is sealingly covered with a cover plate 19 after the sound absorbing material 9 is placed within the acoustic pipe 18.

With the acoustic pipe being the integrally moldable structure, the speaker system is provided with sufficient strength against internal resonance of the acoustic pipe 18. This enables sound distortion produced by the internal resonance of the acoustic pipe 18 to be considerably reduced, and thus the speaker system is enhanced in tone quality. Moreover, the integral molding of the acoustic pipe 18 increases accuracy in size thereof, and it is thereby achieved to reduce in size a TV into which the speaker system of the embodiment is incorporated. The integrally molded structure of the speaker system also enhances productivity of the speaker system and considerably reduces manhours for assembling it.

Figure 5:
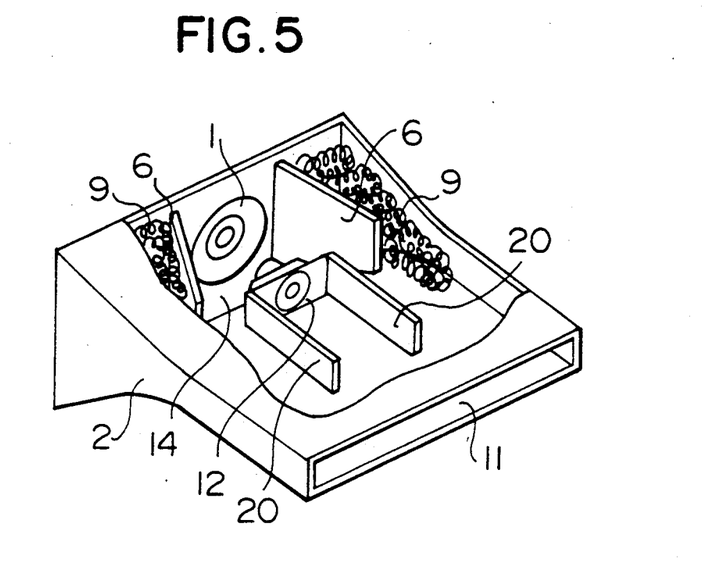
FIG. 5 is a perspective view, partly cut away, of a second embodiment of the speaker system of the present invention.
Figure 6:
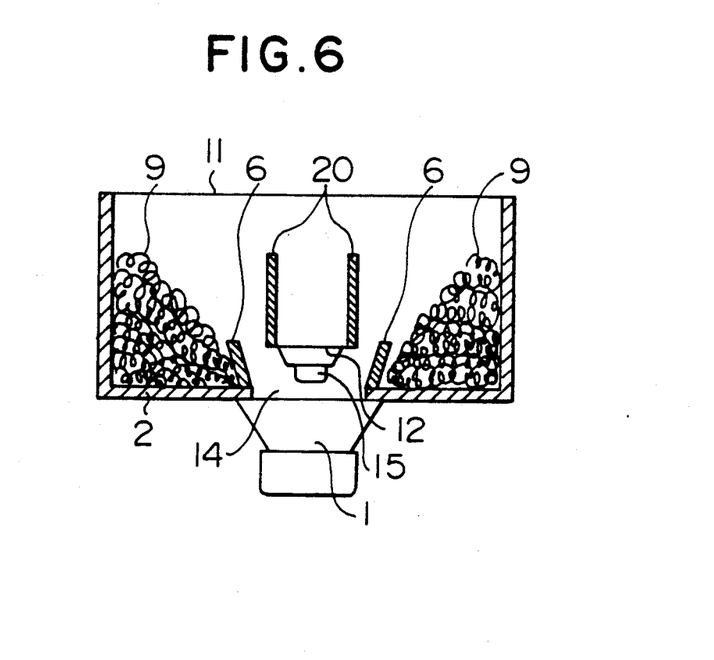
FIG. 6 is a cross-sectional view on a modified scale of the speaker system of FIG. 5.

FIG. 5 is a perspective view, partly cut away, of a second embodiment of the speaker system of the present invention, in this embodiment, a pair of parallel reflection plates 20 are arranged at respective opposite sides of the high frequency range reproducing speaker 12 in addition to the speaker system shown in FIGS. 1 and 2. The reflection plates 20 conduct the high frequency component sound wave, reproduced by the high frequency range reproducing speaker 12, to the open end 11 of the acoustic pipe 2.

Figure 7:
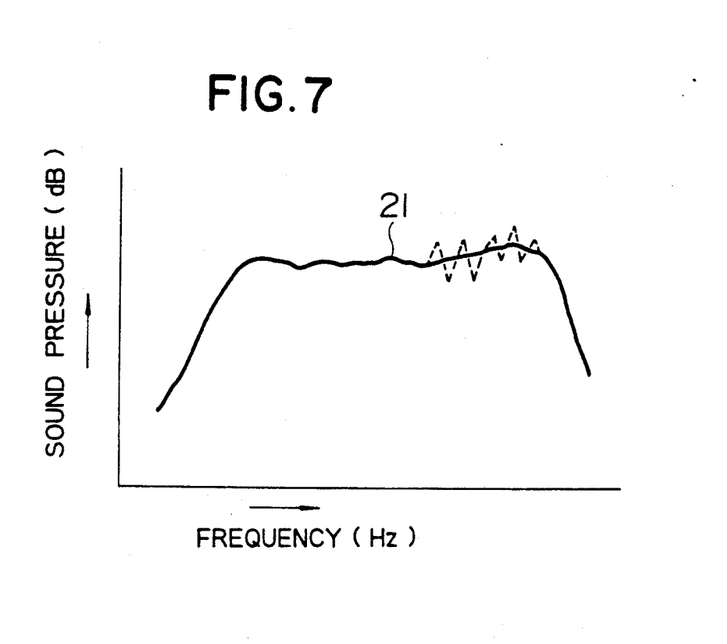
FIG. 7 is a graph showing a sound pressure vs. frequency characteristic of the speaker system of the FIGS. 5 and 6, the speaker system being incorporated into a TV.

With the speaker system, a high frequency component which is reproduced by the high frequency range reproducing speaker 12 is conducted to the open end 11 of the acoustic pipe 2 by a sound conductor constituted by the parallel reflection plates 20 disposed in front of the high frequency range reproducing speaker 12. Thus, the waveform of the high frequency component within the acoustic pipe 2 is not disturbed or not cross modulated by sound wave reproduced from the middle and low frequency range reproducing speaker 1, and thereby sounds reproduced by the speaker system are conducted as sound signals composed in a substantially natural state to the open end 11 of the acoustic pipe 2. As shown in the sound pressure-frequency characteristic graph of FIG. 7, the speaker system is, accordingly, capable of exhibiting a characteristic having relatively high sound pressure at the middle and high frequency range with small peak dips. Also in the second embodiment, the problem that sound moves up and down in a high and middle frequency range is overcome by close coaxial arrangement of the two speakers and sound signals reproduced by the speaker system of this embodiment is superior in quality to those reproduced by the speaker system of the first embodiment. This embodiment exhibits excellent characteristics in both sound image localization and articulation of sound, which have not been achieved by the prior art.

Figure 8:
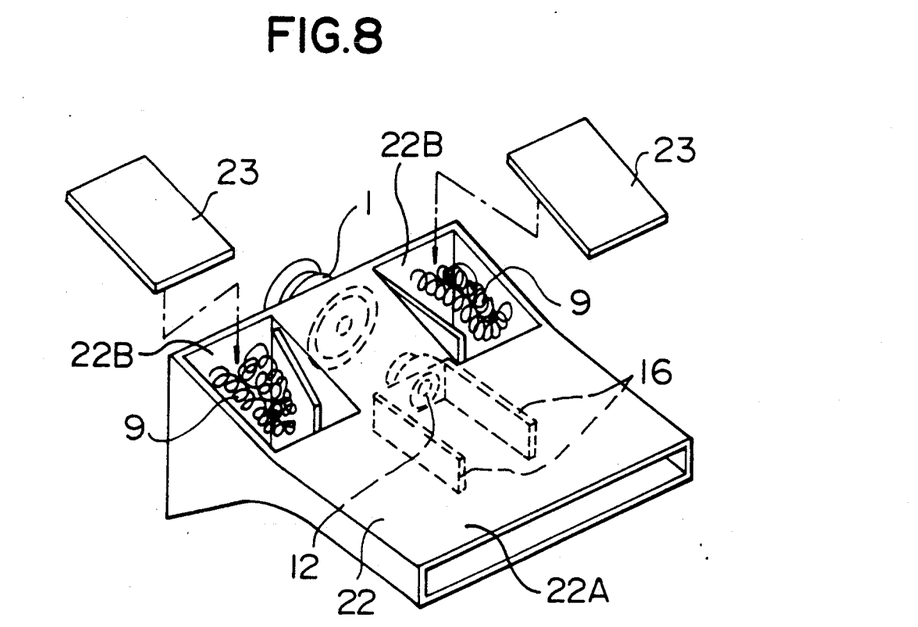
FIG. 8 is a modified form of the second embodiment in which an acoustic pipe is integrally formed.

FIG. 8 illustrates a modified form of the second embodiment. In the modified speaker system, an acoustic pipe 22 has the same structure as the acoustic pipe 2 of FIG. 4 except that the acoustic pipe 22 is provided in an upper panel 22A thereof with a pair of openings 22B at portions corresponding to respective locations to accommodate the sound absorbing material 9. Each of the openings 22B is sealingly covered with a cover 23 after the sound absorbing material 9 is placed within the acoustic pipe 22 through the openings 22B. Further detailed description of this modified speaker system is omitted since this modification is identical in structure to the embodiment of FIG. 4 in the other points.

Figure 9:
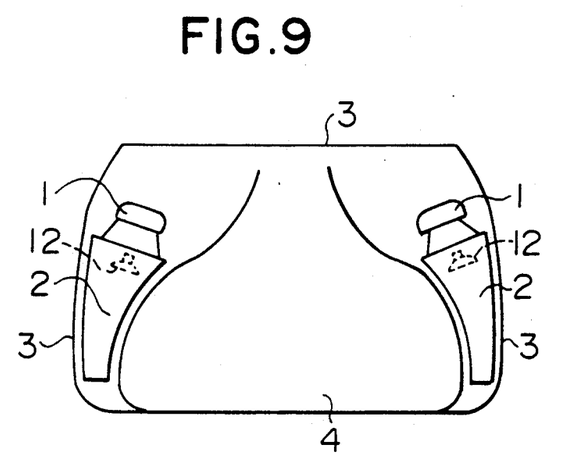
FIG. 9 is a diagrammatic horizontal sectional view of a TV having speaker systems according to the present invention.
Figure 10:
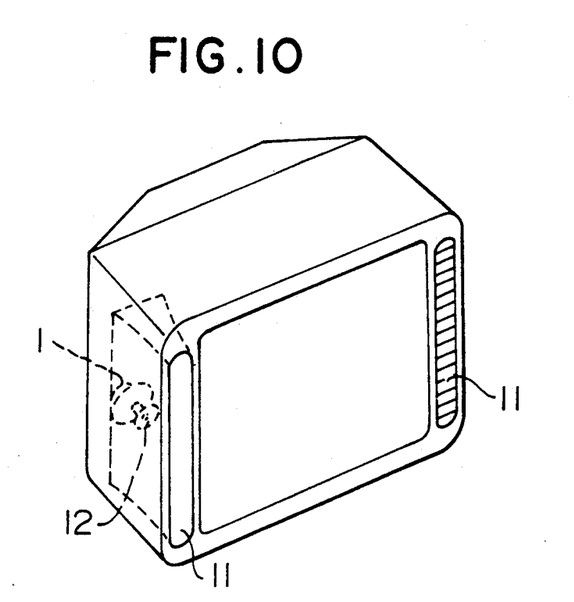
FIG. 10 is a perspective view of the TV of FIG. 9.

FIGS. 9 and 10 illustrate a TV into which a pair of the first embodiment of the speaker systems of the invention are incorporated. Each of the acoustic pipes 2 is placed along a cathode tube 4. A TV cabinet 3 is formed so that it fits to each acoustic pipes 2. This construction of the TV achieves miniaturization thereof with ease.

FIG. 10 is an illustration of a TV having a pair of the speaker systems of the first embodiment incorporated into it so that the open ends 11 of the acoustic pipe 2 of the speaker systems are placed at respective sides of the front of the TV.

As already described in connection with the first and second embodiments, the TV with such a construction also achieves reduction in size, and the accommodated speaker systems enable high tone quality sound signals to be reproduced.

Figure 11:
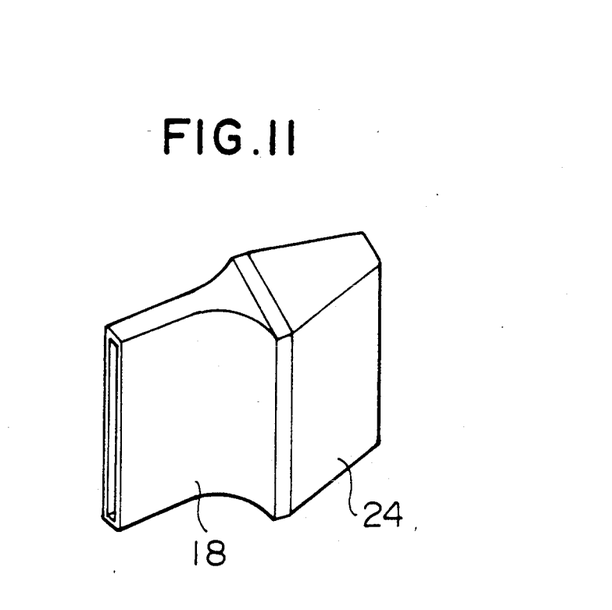
FIGS. 11 and 12 are perspective views of the other embodiments of speaker systems of the present invention.
Figure 12:
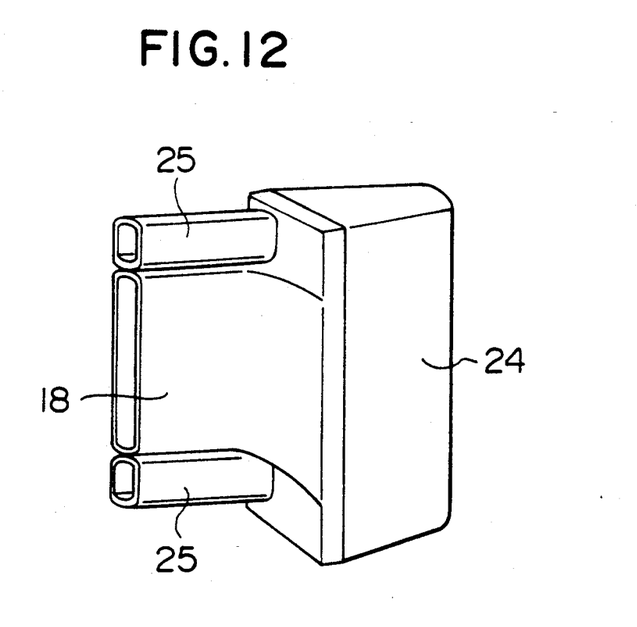

Also in a case where a speaker system of the invention is provided with a rear cabinet 24 and/or bass reflex ports 25 as shown in FIGS. 11 and 12, the same advantages resulted from the speaker systems according to the invention can be obtained.

What is claimed is:

1. A speaker system comprising:
   a first speaker for reproducing a middle and low frequency sound;
   an acoustic pipe, for conducting a sound wave, arranged in front of said first speaker, said acoustic pipe having a substantially rectangular open end portion,
   a second speaker, for reproducing a high frequency sound, disposed within said acoustic pipe and aligned coaxially with and in front of said first speaker, said second speaker including a magnetic circuit portion, and
   a sound absorbing material disposed on opposite sides of said second speaker to define a cavity in which said second speaker is disposed, said cavity conducting a sound wave from the first speaker,
   said second speaker reducing an open vertical sectional area of said cavity such that it is 20-50% smaller than an effective radiation area of said first speaker, whereby said second speaker including said magnetic circuit portion serves as an acoustic equalizer of said first speaker, and
   said open end portion of said acoustic pipe being larger in vertical cross-sectional area than said effective radiation area of said first speaker.

2. A speaker system comprising:
   a first speaker for reproducing a middle and low frequency sound;
   an acoustic pipe, for conducting a sound wave, arranged in front of said first speaker, said acoustic pipe having a rectangular open end portion, a second speaker, for reproducing a high frequency sound, disposed within said acoustic pipe and aligned coaxially with and in front of said first speaker, said second speaker including a magnetic circuit portion, and a sound absorbing material disposed on opposite sides of said second speaker to define a cavity in which said second speaker is disposed, said cavity conducting a sound wave from the first speaker, said second speaker reducing an open vertical sectional area of said cavity such that it is 20-50% smaller than an effective radiation area of said first speaker, whereby said second speaker including said magnetic circuit portion serves as an acoustic lens, said open end portion of said acoustic pipe being larger in vertical cross-sectional area than said effective radiation area of said first speaker, and a distance from a first surface on which said first speaker is mounted to a second surface on which said second speaker is mounted is ⅓ or less than a distance from said first surface to said open end portion of said acoustic pipe.

3. A speaker system as claimed in claim 1, wherein first reflection plates are disposed on opposite sides of a front portion of said first speaker, said first reflection plates constituting a sound conductor for conducting a sound wave emitted from said first speaker, and second reflection plates are disposed on opposite sides of a front portion of said second speaker, said second reflection plates constituting a sound conductor for conducting a sound wave emitted from said second speaker.

4. A speaker system as claimed in claim 1, wherein said acoustic pipe is provided with a pair of covers for covering openings formed therethrough, said openings being adapted for inserting the sound absorbing material into said acoustic pipe therethrough, and said acoustic pipe without said covers is integrally molded.

5. A speaker system as claimed in claim 2, wherein first reflection plates are disposed on opposite sides of a front portion of said first speaker, said first reflection plates constituting a sound conductor for conducting a sound wave emitted from said first speaker, and second reflection plates are disposed on opposite sides of a front portion of said second speaker, said second reflection plates constituting a sound conductor for conducting a sound wave emitted from said second speaker.

6. A speaker system as claimed in claim 2, wherein said acoustic pipe is provided with a pair of covers or covering openings formed therethrough, said openings being adapted for inserting the sound absorbing material into said acoustic pipe therethrough, and said acoustic pipe without said covers is integrally molded.

* * * * *